Nov. 25, 1930.  I. T. HOOK  1,783,016
CABLE AND CONNECTER THEREFOR
Filed Oct. 21, 1924  2 Sheets-Sheet 2
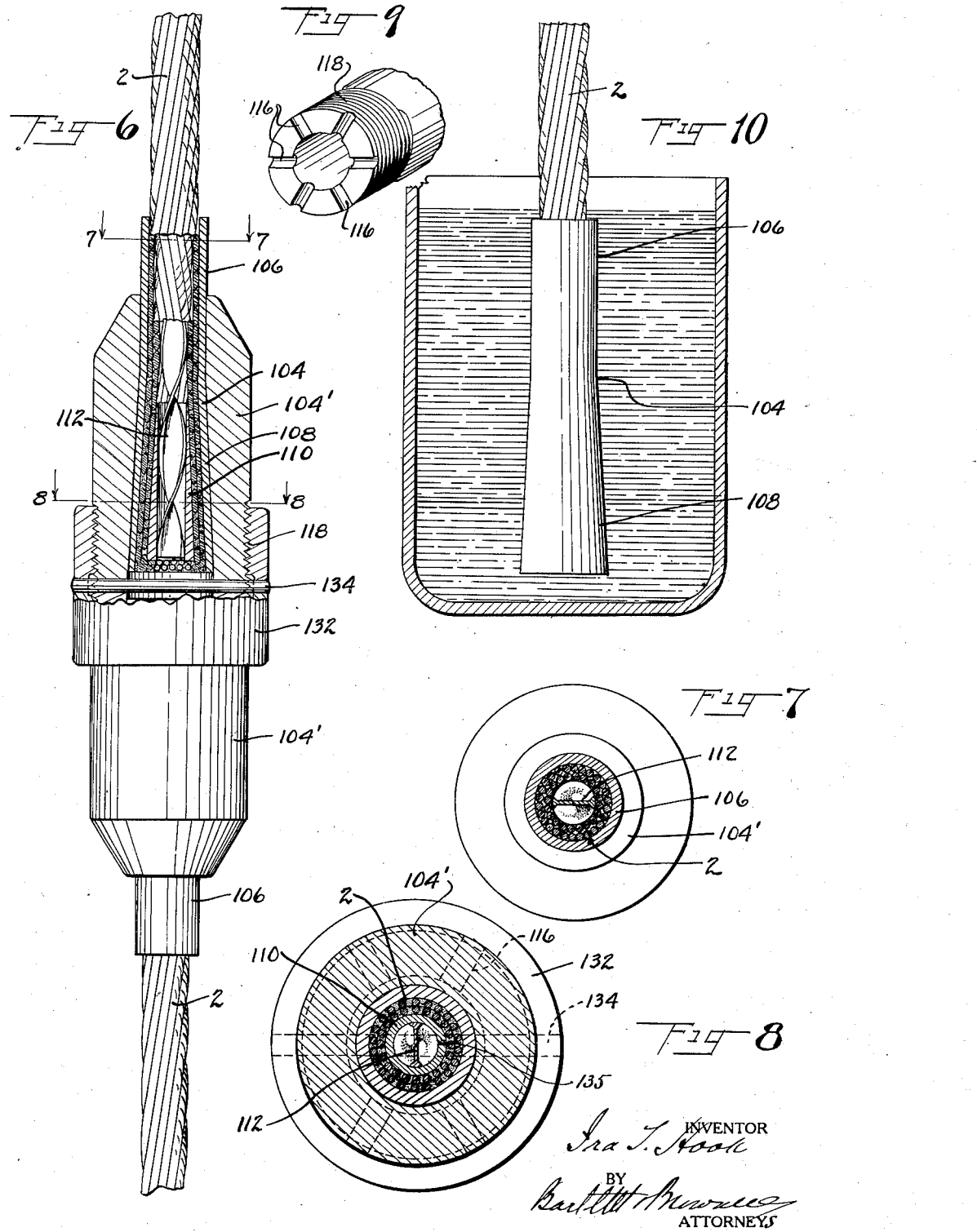

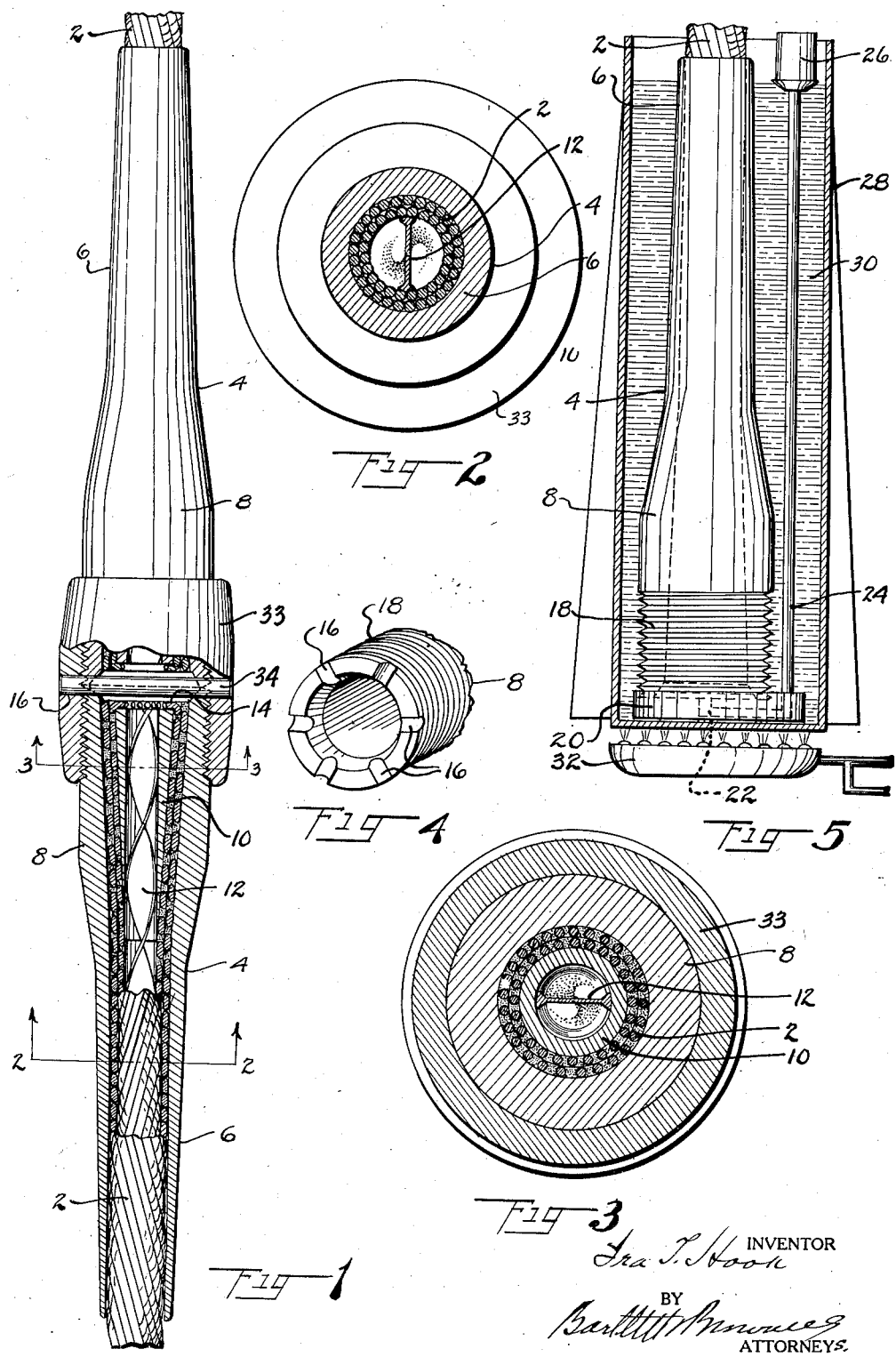

Patented Nov. 25, 1930

1,783,016

UNITED STATES PATENT OFFICE

IRA THOMAS HOOK, OF NEW HAVEN, CONNECTICUT, ASSIGNOR TO THE AMERICAN BRASS COMPANY, OF WATERBURY, CONNECTICUT, A CORPORATION OF CONNECTICUT

CABLE AND CONNECTER THEREFOR

Application filed October 21, 1924. Serial No. 744,876.

My invention relates to cables and connecters therefor and has for its object to produce a cable having a connecter by which the ends of the cable can be securely connected together, which is adapted for use with cables used as electric conductors, and also for use in connecting the ends of steel cables and the like used for other purposes and which is capable of use with cables of large diameter or of the hollow core type.

Various connecters have been suggested and some of them have been tried, but none of them have been entirely satisfactory. In connecting a cable it is necessary to avoid abrupt bends, the annealing of the wires, and too great localization of mechanical pressure. It is also necessary to distribute the strains along the wires for a considerable distance. To obtain these specific objects and thereby produce an effective connecter is the particular purpose of my invention. Another object of my invention is to protect the wires of the cable from abrasion, by reason of contact with the holding members of the connecter. Another object of my invention is to provide a new and improved locking means for securing the parts of the connecter together.

The following is a description of an embodiment of my invention reference being had to the accompanying drawings, in which, Figure 1 shows a cable having two ends connected together in accordance with my invention;

Fig. 2 is a transverse section on the line 2—2, Fig. 1;

Fig. 3 is a transverse section on the line 3—3, Fig. 1;

Fig. 4 is a perspective view of the end of one of the holder members of the conductor;

Fig. 5 illustrates a means for and method of introducing solder into one of the cable ends and holders;

Fig. 6 shows a portion of the cable, the two ends of which are connected together in accordance with a modification of my invention;

Fig. 7 is an enlarged transverse sectional view on the line 7—7, Fig. 6;

Fig. 8 is an enlarged transverse sectional view on the line 8—8, Fig. 6;

Fig. 9 is a perspective view of the screw-threaded and castellated end of a holder; and Fig. 10 is a view showing another manner in which the solder may be applied.

Referring more particularly to the drawings, 2—2 are portions of a cable of the hollow core type, the ends of which are connected in accordance with my invention. The two cable ends are provided with similar connecter members which are secured together by a screw-threaded coupling. The parts on one end are shown in section. The parts on the other end are the same, that end being in elevation. 4—4 are holders which are slipped over said ends. These holders have extended nose portions 6 having cylindrical bores, and portions 8 having conical bores. After these holders are slipped upon the ends of the cable, tapering plugs or wedges 10 are driven into the end of the cable so as to expand the ends of the cable and separate the wires. Where the cables have cores these tapered plugs have bores which surround the cable core. In the embodiment shown in Fig. 1 the cable has a core 12 composed of a twisted metallic strip. The wedge plugs may be split or partially split in order to exert pressure on both core and outside wires. The ends of the wires are bent over as at 14 so as to engage the butt ends of the plugs 10. The holders 4 before the plugs 10 are driven in place, are moved to the position shown so that the separated ends of the wires of the cable are clamped between the plug 10 and the corresponding holder. When the wires are thus firmly clamped the interstices between the wires are filled with solder which acts to secure the wires to the plugs 10 and to the holders, the solder extending substantially throughout the cylindrical bore of each portion 6 as well as through the conical bore in the portion 8 so as to distribute the strain upon the wires for a considerable distance throughout their length. The portion 6 containing the cylindrical bores are termed "extended noses" and are important features of my invention, since they enable the strain distribution above referred to and, being relatively thin, conforms somewhat to the curvature of the cable when bent and stretches with the cable when under stress.

The adjacent ends of the holders 4 are castellated as shown in Fig 4, resulting in diametrical grooves 16, and are screw-threaded as shown at 18.

In order to secure the plugs 10, the holders 4, and the wires lying between them, together, I provide a disk 20 having a screw-threaded opening adapted to engage the screw-thread 18 and extending upward so as to cover the ends of the slots 16. This disk is provided with a channel 22 with which connects a vertical pipe or runner 24, terminating in a receptacle 26, for receiving molten solder. The solder poured into the receptacle 26 flows downward through the runner 24 and upward into the interior of the holder 4 to its top portion, securing the wires to the holder throughout the length of the holder and securing the wires to the plug 10 throughout its length. The holder being inverted while the solder is introduced, the solder is forced upward by metal-static pressure, which action may be accelerated by moving a pumping rod up and down within the runner 24. As soon as the solder has been introduced into the holder in the above manner the holder is removed and instantly cooled, after which the pouring fixture is removed. In order to maintain the solder in molten condition, I provide a tank 28 filled with a heating bath 30, preferably of Crisco or other suitable compound whose flash point is higher than the melting point of the solder used and below an annealing heat for the wires. This not only keeps the solder molten while being introduced but heats up the holder 4 so as to assist in the introduction of the solder. Its flashing automatically indicates its temperature. The contents of the container 28 are kept in heated condition by a suitable heater 32.

In place of Crisco, palm oil, or linseed oil, or a high flash point mineral oil may be used. Since the flash point of these oils is less than 600° F. there is little danger of the annealing of the cable wires and the flash furnishes an automatic indication of an undersirably high temperature. An inorganic low melting salt may also be used but has to be watched more carefully to see that the temperature does not get so high as to cause serious annealing of the wires. It is necessary to leave the connecter in the bath only long enough to come up to the melting temperature of solder—a perfectly safe value for hard drawn or tempered wire.

Two cable ends thus prepared are united by an interiorly screw-threaded coupling 33, the ends of said coupling preferably having right and left hand threads respectively, engaging corresponding threads upon two holders. The coupling is provided with diametrical openings, through which passes a pin 34 which pin passes through the grooves 16 into the opposed holder ends so as to lock those two ends against movement relatively to one another and to the sleeve 34, thus locking the parts in position. The pin 34 has its ends slightly upset so as to be held in place.

Instead of making the holder member of the connecter out of a single piece of metal as in Fig. 1, it may be made in two parts, as shown in Fig. 6, namely, an inner part 104, constituting a seamless compression sleeve or internal holder and having a cylindrical bore at the extended nose portion 106 whose diameter is equal to the normal diameter of the cable and a cylindrical exterior, and a portion 108 having a conical bore adapted to fit an expanded portion of the cable, and a corresponding conical exterior, the other part 104′ being an external holder having a bore, part of which is cylindrical, the part of which is conical corresponding to the external shapes of corresponding portions of the inner holder. The external holder is provided with screw threads 118 adjacent to the end of the cable section and with diametrically extending grooves 116 such that its end portion is in castellated form.

In applying this connecter the external and internal holder sections are first slipped upon the cable. The internal holder section or compression sleeve being located adjacent to the end thereof, the wedge plug 110 is then driven into the end of the cable so as to surround the core 112, here shown as a twisted strip, and spread the wires and bind them against the compression sleeve, after which the ends of the wires are bent over the butt end of the plug. The assembly of the wires, the plug and compression sleeve is then dipped into a bath of molten solder as shown in Fig. 10, the solder preferably extending substantially to the end of the nose of the sleeve so as to secure the wires to the sleeve throughout its full length and to the plug. Such a method produces satisfactory results and is convenient for use in the field. After the parts have remained in the molten solder for a short time and before annealing takes place, they are taken out and cooled at once, the solder on the outside surface of the inner holder being first wiped off. The two ends thus prepared are secured together by screwing the screw-threaded coupling 132 upon the ends of two external holders 104′ and fastening them in position by the pin 134. In this form the plug is shown as split throughout its length at 135 (Fig. 8) so as to exert a pressure on both the wires and the core 12, the pressure of the wires holding the slit closed.

Aside from the division of the holders into internal and external members, this construction is substantially the same as the construction of Figs. 1 to 4.

The inner holder 104 is a relatively thin seamless sleeve which, when the slit plug 110 is driven in, takes the plug pressure and more or less closes the slit. This compression sleeve, by taking on its exterior surface whatever slip occurs between the cable and outer holder, prevents the wires from being injured by abrasion. The solder not only acts to make the cable end integral with the plug and sleeve but provides a soft matrix to help distribute the compression stresses. It helps to equalize the stresses and prevents any local action which may cause fatigue failure. The conical walls of the sleeve are made soft enough to allow a slight embedding of the wires; is thin enough to transmit the high compression stresses from the holder walls to the wires; while at the same time strong enough to resist the plug pressure before the holder is brought up.

The portions of the holders having cylindrical bores are termed "extended noses" and they extend forward along the cable far enough to enable the solder to transmit a percentage of the load approximately equivalent to the loss in strength of the cable due to the mechanical pressure between the wedge plug and holder. They are preferably longer than the plugs and conical bores therefor. The solder also unifies the plug with the cable so that the two will move forward together, increasing the pressure as the movement progresses. It also increases the bearing area for the plug pressure. It also stops any slight movement between the said parts, which may otherwise result in a fatigue failure.

On account of the solder therein the extension of the nose of the holder or compression sleeve transmits part of the load to the holder, relieving the wires of an equivalent amount before the mechanical wedge is reached.

As will be evident to those skilled in the art, my invention permits of various modifications without departing from the spirit thereof or the scope of the appended claims.

What I claim is:

1. A cable connecter comprising a cable having an expanded end, a sleeve thereon having a conical bore portion adjacent to the expanded end of the cable and a tubular portion of uniform internal diameter extending along an unexpanded portion of the cable and securing material within both said conical and tubular portions adhering to said cable and sleeve and connecting the same together, said adhering material within the tubular portion gradually transferring the stress of the cable to the sleeve.

2. A cable connecter comprising a cable having an expanded end, a sleeve thereon having a conical bore portion adjacent to the expanded end of the cable and a tubular portion of uniform internal diameter extending along an unexpanded portion of the cable, securing material within both said conical and tubular portions adhering to said cable and sleeve and connecting the same together, said adhering material within the tubular portion gradually transferring the stress of the cable to the sleeve, said sleeve having a conical exterior surface surrounding said conical bore and an external sleeve-like holder having a conical bore adapted to fit a conical exterior portion of the sleeve, the opening at the end of the holder adjacent to the larger end of the sleeve being as large as said larger end of said sleeve so that said larger end can be moved into and out of said holder.

3. A cable connecter comprising a cable having an expanded end, a sleeve thereon having a conical bore portion adjacent to the end of the cable and a tubular portion of uniform internal diameter extending along an unexpanded portion of the cable and securing material within both said conical and tubular portions adhering to said cable and sleeve and connecting the same together, said adhering material within the tubular portion gradually transferring the stress of the cable to the sleeve, the tubular portion being relatively thin.

IRA THOMAS HOOK.